(No Model.) 4 Sheets—Sheet 3.

T. P. COOK.
SPRING MOTOR.

No. 410,137. Patented Aug. 27 1889.

Witnesses
G. A. Tauberschmidt,
L. B. Whitaker.

Inventor
Thomas P. Cook
By his attys
Whitaker & Prevosh

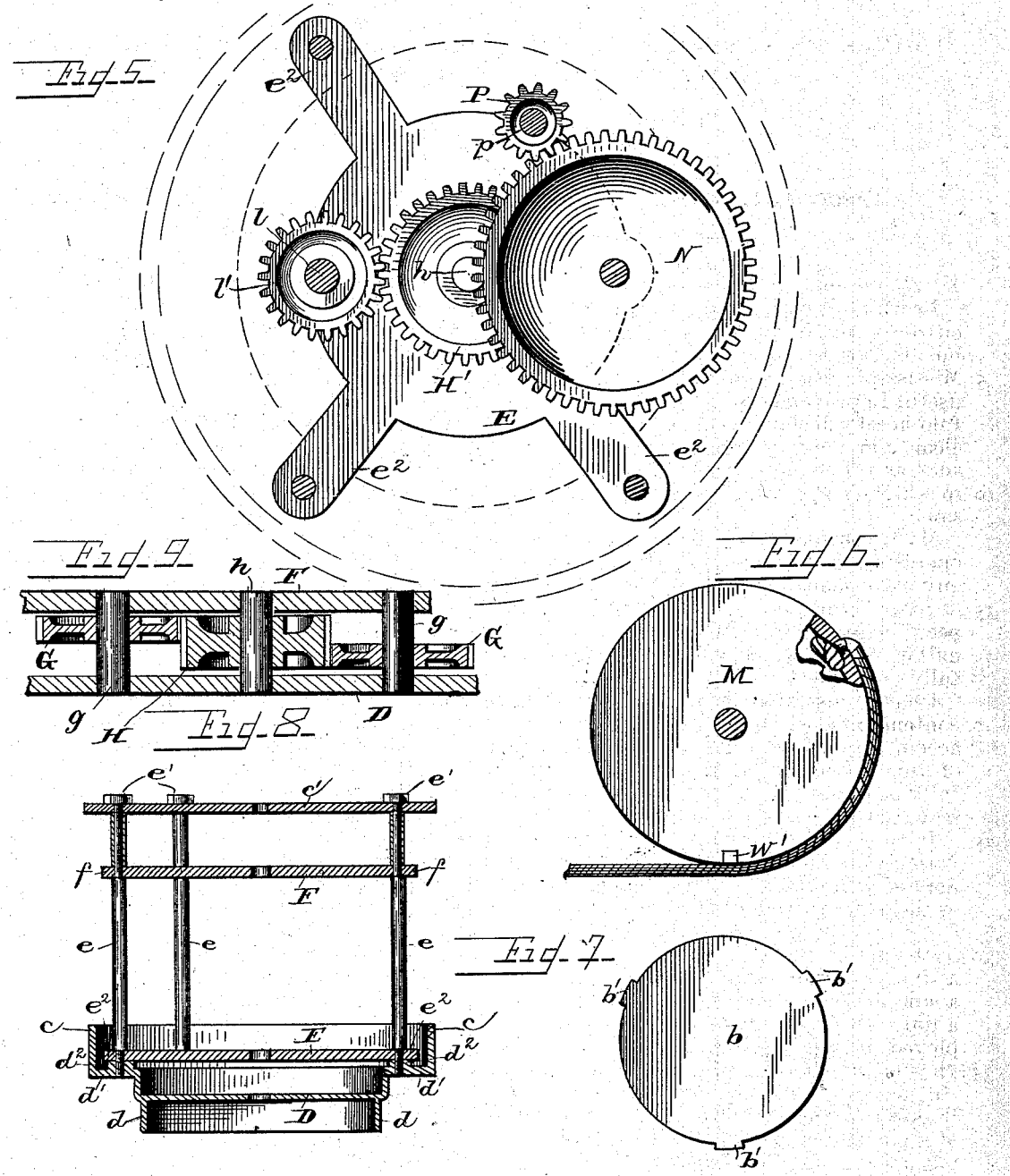

UNITED STATES PATENT OFFICE.

THOMAS PRINCE COOK, OF COLUMBUS, MISSISSIPPI, ASSIGNOR OF ONE-HALF TO L. M. TUCKER, OF SAME PLACE.

SPRING-MOTOR.

SPECIFICATION forming part of Letters Patent No. 410,137, dated August 27, 1889.

Application filed December 12, 1888. Serial No. 293,404. (No model.)

*To all whom it may concern:*

Be it known that I, THOMAS PRINCE COOK, a citizen of the United States, residing at Columbus, in the county of Lowndes and State of Mississippi, have invented certain new and useful Improvements in Spring-Motors; and I do hereby declare the following to be a full, clear, and exact description of the invention, such as will enable others skilled in the art to which it appertains to make and use the same.

My invention relates to spring-motors for operating fans, sewing-machines, lathes, or any other machinery where a small amount of power is desired; and it consists in certain peculiar features of construction and combination of parts, which will be hereinafter more fully described.

I have illustrated one form in which I have contemplated embodying my invention in the accompanying drawings, which form a part of this specification, and said invention is fully disclosed in the following description and claims.

Figure 1:
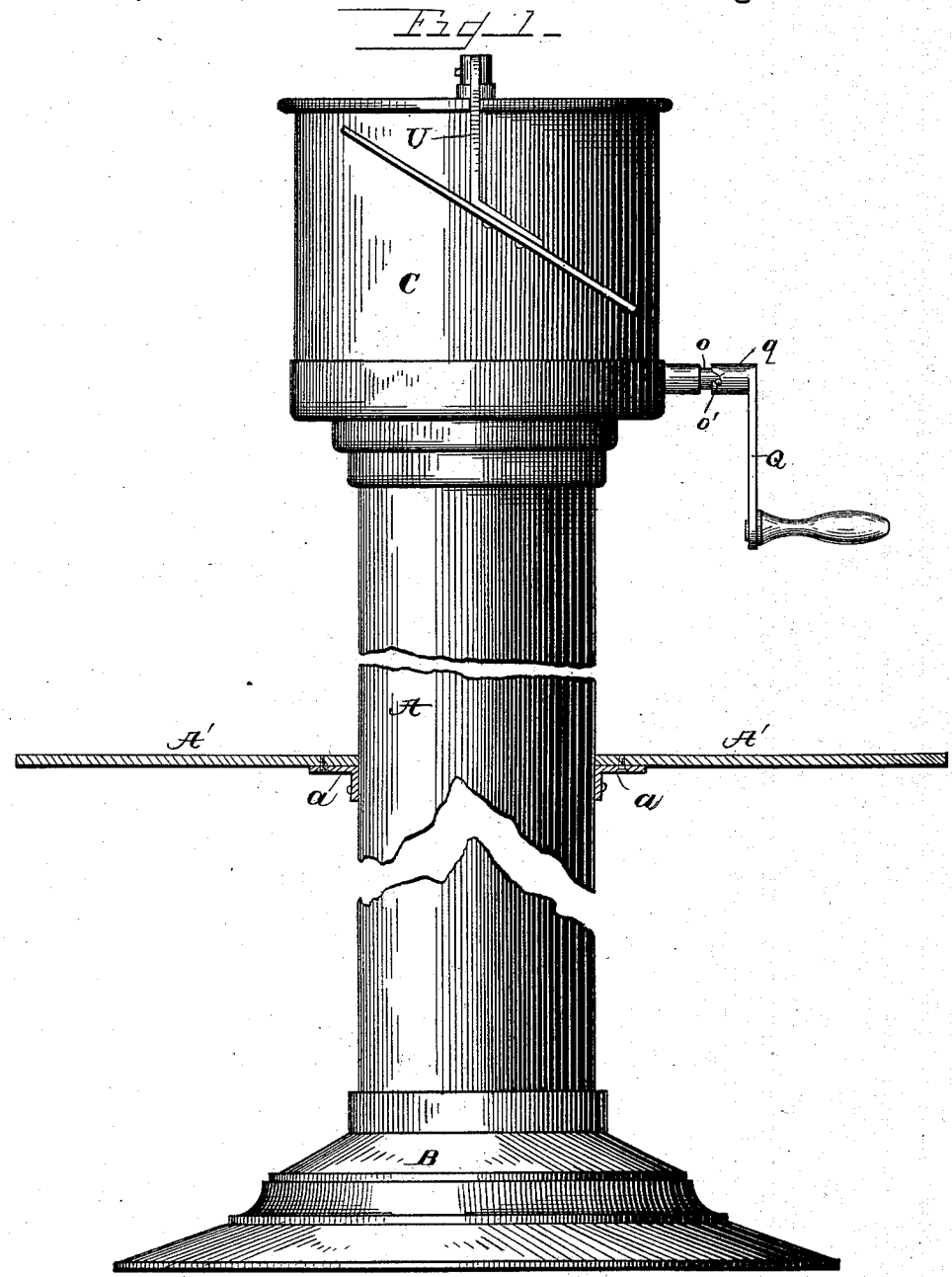
Figure 2:
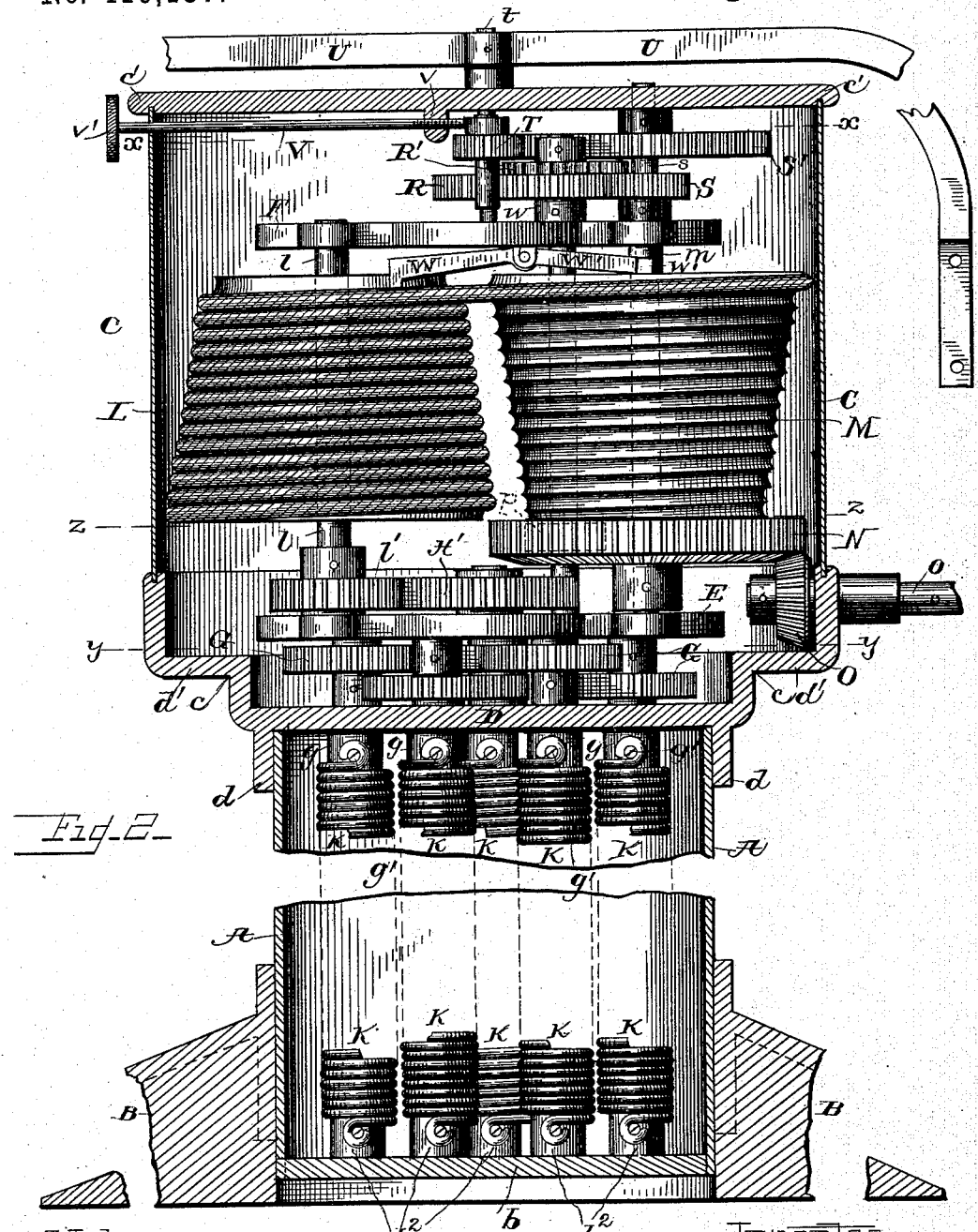
Figure 3:
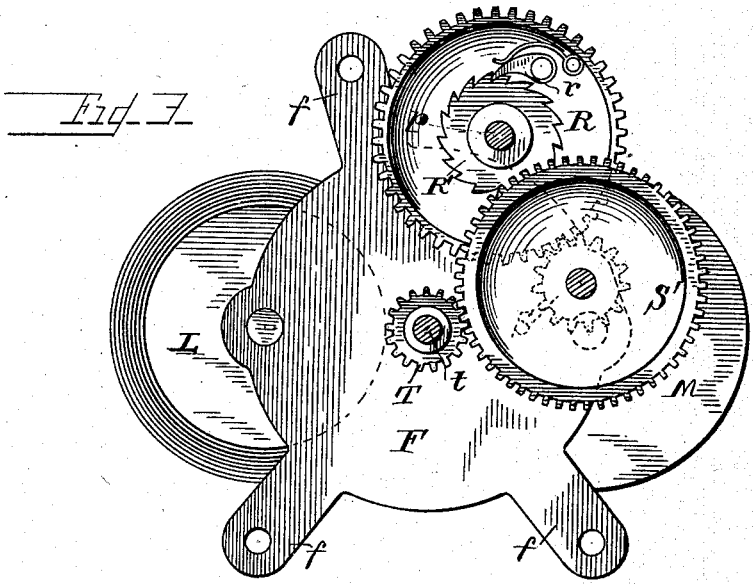
Figure 4:
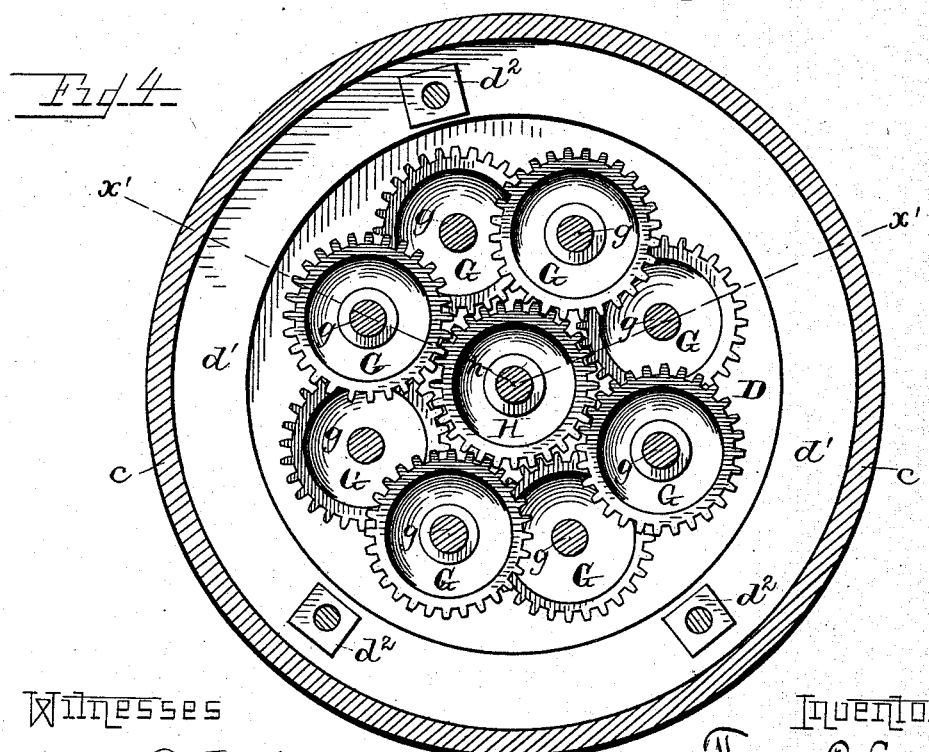

In the drawings, Figure 1 is a view in elevation of an apparatus, showing my invention applied to an automatic fan. Fig. 2 is a view of the same with the casing in section. Fig. 3 is a horizontal section of the upper portion of the apparatus on line $x\ x$, Fig. 2. Fig. 4 is a similar section on line $y\ y$, Fig. 2. Fig. 5 is a similar section on line $z\ z$, Fig. 2. Fig. 6 is a top view of one of the drums or fusees employed in my improved motor. Fig. 7 is a view of the bottom of the spring-chamber. Fig. 8 is a view, on a slightly smaller scale, illustrating the method of securing the frame of a portion of the apparatus together. Fig. 9 is a section of Fig. 4 on line $x'\ x'$.

In the form of apparatus shown in the drawings, A represents a column or pedestal which consists of a hollow tube of circular or other form in cross-section. This tube may be cast or formed of sheet material, as preferred, and may be of iron, wood, or other suitable material.

B is the base of column, solid or hollow, as desired, which surrounds the tube for a short distance near the bottom of the same, and is secured thereto by any preferred means.

Upon the upper end of the tube or column A is mounted the casing C, which is of slightly greater diameter than the column and formed in any desired manner. I prefer to construct this casing, as shown in the drawings, by providing the top and bottom portion or castings $c'\ c$, connected by a short tube of circular or other form. The bottom portion or casting $c$ consists of the plate D, provided with a downwardly-extending flange $d$, which engages the upper extremity of the column A. From the plate D the side portions of the part $c$ extend upward in two vertical flanges of unequal diameters connected by a horizontal annular portion $d'$, the flange having the greater diameter extending upward and the smaller downward from the part $d'$. The plate D is provided with a central aperture or bearing, and a series of apertures or bearings surrounding the same disposed in a circular row. The annular portion $d'$ is provided with three or more lugs $d^2$, upon which is placed a spider E, consisting of a nearly circular plate having apertures similar to those of the plate D, and arms $e^2$, which are secured to the said lugs.

In attaching the spider E to the lugs $d^2$, I prefer to employ metal rods $e$, as shown in Fig. 8, which are screw-threaded at their lower ends. These rods pass through apertures in the arms of the spider E, enter screw-threaded apertures in the lugs $d^2$, and each is provided with a shoulder which impinges against the upper face of the spider-arm $e^2$ and serves to hold the spider in place. The upper extremity of each of the rods $e$ is preferably the same size as the screw-threaded lower portion of the rod, and a shoulder is thereby formed a short distance below the upper end of the rod. These shoulders support the arms $f$ of a similar spider F, which are apertured to engage the rods $e$. The upper ends of these rods $e$ extend through the top plate $c'$ of the casing C, and their upper extremities are provided with nuts $e'$ above said plate. I prefer to place a tube or pipe around the rods $e$ between the spider F and the top plate $c'$, as shown, and by this construction the spiders E F and the top plate $c'$ will be held firmly in position.

A series of studs $g$, bearing gears or pinions G of equal size, are journaled in the circular row of apertures in the plate D and spider E, and extend a short distance below said plate. These pinions are preferably arranged, as shown in Figs. 2 and 4, in two series in different horizontal planes, the gears in the upper plane overlapping the edges of the gears in the lower plane, just sufficient distance being left between the gears of one series to permit the stud and hub of the gears of the other series to be placed in position without interfering with the operation of the parts. By this means the pinions can be placed in a very compact position, as will be readily seen, and a much smaller space be occupied by them than when arranged in a single horizontal plane. It will be impracticable to employ small pinions on the studs $g$, as in such case the winding up of the springs would be very difficult, if not impossible. In order to provide the studs with pinions of such a size that the winding may be conveniently effected, and to reduce the diameter of the inclosing-column to practicable and convenient dimensions, this overlapping of the pinions is necessary. In the central apertures of the plate D and spider E is journaled a short shaft $h$, which is provided between said plate and spider with a broad-faced pinion H and above the spider with a pinion H'. The teeth of pinion H are of sufficient width to engage with all of the pinions G in both planes, so that a revolution of the pinion H actuates each of the pinions G. To the studs $g$ are secured spiral torsion-springs K, in any preferred manner. I have shown each stud as provided with a pin $g'$, engaging a loop in the end of the spring, and while this is my preferred construction it is not essential. The bottom plate $b$ of the column is of circular form, of a size which will enable it to fit within the bottom portion of the tube A, and said plate is provided with projections or lugs $b'$, which engage recesses in the walls of the tube A at the end of the same, as shown in Fig. 8, which construction will prevent the plate $b$ from turning. The plate B is provided with studs or lugs $b^2$, rigidly secured to the same, corresponding in form and arrangement to the studs $g$ in the plate D, and the lower extremities of the springs K are attached to these studs $b^2$ in a manner similar to that in which they are attached to studs $g$, before described. When the construction of plate $b$ shown in Fig. 8 is employed, the springs K may be attached first to the studs $g$, then drawn down and attached to the studs $b^2$, when the plate $b$ may be placed in position, and will be held firmly in place in the tension of the springs. By the construction and arrangement of gears before described the springs may be placed very close together, and a column of less diameter may thus be employed, rendering the apparatus more compact and less costly. Two tapering drums or fusees L M, provided with spirally-grooved faces, are mounted upon shafts $l\ m$, journaled in apertures in the spiders E and F in such a manner that the smaller end of the drum L is adjacent to the spider F, while the smaller end of drum M is adjacent to spider E, so that the size of one increases as the other decreases. The shaft upon which the drum L is mounted is provided below said drum with a pinion $l'$, which engages the pinion H' on shaft $h$. A wire or other rope is attached to the lower part of drum L, wound upon the same, and attached to the upper edge of the drum M. The shaft upon which the drum M is mounted is also provided beneath the same with a gear-wheel N, having bevel gear-teeth upon its lower face. These bevel gear-teeth are engaged by a bevel-pinion O, mounted upon a horizontal shaft $o$. This shaft extends through the casing C, and is journaled in the same, and has its outer end adapted to receive a winch or crank to turn it. A vertical shaft $p$ is journaled in spiders E and F in the rear of the shaft $m$, and its lower end is provided with a small pinion P, which engages the teeth on the vertical edge of gear-wheel N. The upper end of the shaft $p$ is provided with a gear-wheel R, loosely mounted upon the shaft, and also with a ratchet R' of less diameter than the gear R, which is keyed to the shaft. The gear R is provided with a spring-pawl engaging the ratchet, so that a movement of the shaft $p$ in one direction causes the gear to revolve, while a movement in the opposite direction allows the ratchet to turn, the teeth slipping past the pawl. A short shaft $s$ is journaled in the spider F and in the top plate $c'$ of the casing adjacent to the gear R, and is provided with a pinion S of less diameter than gear R, and also with a larger gear-wheel S' above the pinion S. A shaft $t$, which may be termed the "power-shaft," is journaled in the same manner as shaft $s$, and extends through the top plate $c'$ at the center of the same. A pinion T is keyed on the shaft $t$ and engages the gear S', and the shaft $t$ above the top plate $c'$ is provided with the curved fan-arms U U, which are preferably in one piece, secured to the shaft at the center. These arms may curve downward adjacent to the side walls of the casing C, and their ends are bent at an angle, as shown in Fig. 1. To these bent portions are attached fan-blades of any preferred construction in such a manner that when the fan-arms are rotated the air will be deflected downward.

When it is desired to operate the apparatus, the handle is rotated, which, through the bevel-gears O and N, will actuate the drum M and wind the rope from drum L upon drum M, thereby actuating the shaft $l$, and through gear $l'$ actuating the central pinion H'. This pinion will in turn actuate all the pinions G and wind up the torsion-springs K. As the gear N rotates, the shaft $p$, which it actuates, will also rotate in a direction to permit the ratchet R' to slip past the pawl $v$ and the fan-arms remain stationary.

In order to retain the apparatus in a stationary condition when the springs are wound up, I provide a rod V, which extends through the casing C. The inner end of this rod is screw-threaded and engages a screw-threaded aperture in a lug $v$, attached to or formed integrally with the top plate $c'$. The outer end of the rod V is provided with a milled head, and when it is screwed up until the inner end impinges tightly against the hub of pinion T on shaft $t$ it will prevent the apparatus from moving.

When it is desired to operate the fans, the springs being wound up, the rod $v'$ is turned sufficiently to release the hub of gear T, when the power of the spring will be imparted to the fusee L, which will wind the rope slowly from the drum M, and thereby actuate the fan through the train of multiplying gearing before described. By means of the fusees L and M the power exerted by the spring K will be substantially the same throughout the movement effected by them. The drums L M are preferably made hollow, and in attaching the wire or other rope I prefer to pass the same through an aperture in the wall of the drum and secure it by forming a knot or in any other effective manner. The springs K are at a considerable tension even when the cord is wound entirely upon the drum L, which is in the position of the parts before unwinding.

In order that the drum L may not be permitted to draw the cord or rope so far as to pull directly upon its connection with the drum M, thereby straightening the rope, I provide the following construction: A trip-lever, having a weighted arm W and a lighter arm W', preferably joined at a slight angle to each other, is pivoted in ears $w$, projecting from the lower face of the spider F, nearly in line with the cord or rope as it passes from one drum to the other and slightly above the same. A stop or lug $w'$ is located, preferably, upon the upper face of the drum M in line with the arm W' of the lever. The lever is so adjusted that the weight of the arm W will keep it depressed and the arm W' out of the path of the stop $w'$; but when the rope is being wound upon the uppermost groove of the drum L it will engage the weighted arm of the lever and raise it, thereby depressing the arm W' into the path of the stop. As the drum M rotates further, the stop will engage the end of the lever W' and the movement of the same will be arrested. This stop is so situated that the cord will not be quite unwound from the drum M when the apparatus is brought to a condition of rest; hence the straightening of the rope and the injurious jerking of the same from the point of its attachment to the drum will be entirely avoided, as a few repetitions of the straightening and rebending of the wire rope, which I prefer to employ, would cause it to break or fracture at that part. When the drum M is rotated in the opposite direction to wind up the rope and the springs, the first revolution of the drum M will remove the rope from the uppermost groove of drum L, thereby releasing the weighted arm W of the trip-lever, which will fall and raise the arm W' out of the path of the stop. A similar trip-lever (not shown) may be employed in connection with the lower face of the drum L, or in some other preferred position, and I may employ a spring instead of the weighted arm, if desired.

In Fig. 1 I have shown the column or pedestal A provided at a convenient distance from the base or the floor upon which it rests with a table A' of any desired, but preferably of circular, form. To the wall of the column is attached a flange $a$, which may be composed of angle-iron and secured by screws or rivets, or be cast integrally with the column; or I may employ brackets, if desired. To this flange the table A' is secured by means of bolt, screws, or rivets. I prefer to employ this construction where the motor is used to actuate a fan, and the column is of such a height that the fans will pass above the heads of persons standing near the device.

It is obvious that if, when attempting to wind up the springs, the handle Q should be turned in the wrong direction the apparatus would be liable to be strained or otherwise injured. To prevent this I provide the form of handle shown in Fig. 1, in which the portion of the same surrounding the shaft $o$ is provided with a notch $q$, having one wall curved or inclined, adapted to engage a stud $o'$ on shaft $o$, as shown in the drawings. When the handle is turned in a direction to wind up the springs, the straight-edge notch will engage the stud and cause the shaft to revolve; but if the handle should be turned in the wrong direction the curved or inclined sides of the notch $q$ would engage the stud $o'$, and cause the handle to move laterally, thereby disengaging it from the shaft.

While I have shown my improved motor as applied to operate an automatic fan, it is obvious that by removing the fan-arms and placing a pulley upon the upper extremity of shaft $t$, or in other ways, the power of the motor might be used for operating various forms of machinery.

What I claim, and desire to secure by Letters Patent, is—

1. In a spring-motor, the combination, with the coiled torsion-springs, of the inclosing-casing for said springs provided with notches or recesses, and a bottom plate having the springs rigidly connected thereto and provided with projections fitting the notches or recesses of the casing, whereby the said bottom plate will be held in position by the tension of the springs, substantially as described.

2. The combination, with the two fusees, one of which is provided with a stop and their connecting cord or rope, of the weighted stop-lever, substantially as described.

3. The combination, with the hollow column, of the torsional spring inclosed therein, the broad-faced pinion H, centrally located with respect to said springs, and the overlapping gears connected to said springs and engaging said broad-faced pinion, substantially as described.

4. The combination, with the hollow supporting-column, of the gear-casing mounted thereon and the gearing-supports within said casing, the same consisting of the bottom casting $c$, the top plate $c'$, the spiders E F, and the connecting-rods $e$, substantially as described.

In testimony whereof I affix my signature in presence of two witnesses.

THOS. PRINCE COOK.

Witnesses:
J. H. WHITTAKER,
L. P. WHITTAKER.